United States Patent [19]

Nishikawa

[11] Patent Number: 5,010,249

[45] Date of Patent: Apr. 23, 1991

[54] DIAMOND PROBE AND FORMING METHOD THEREOF

[75] Inventor: Akira Nishikawa, Tokyo, Japan

[73] Assignee: Seiko Instruments Inc., Japan

[21] Appl. No.: 406,458

[22] Filed: Sep. 13, 1989

[30] Foreign Application Priority Data

Sep. 13, 1988 [JP] Japan .................................. 63-228991

[51] Int. Cl.⁵ ............................................. H01J 37/26
[52] U.S. Cl. .................................. 250/306; 324/158 P; 156/632
[58] Field of Search ................. 250/306, 307; 156/632; 324/158 P

[56] References Cited

U.S. PATENT DOCUMENTS 4,668,865  5/1987  Gimgewski et al. ................. 250/306
4,873,115 10/1989  Matsumara et al. ................... 427/34

Primary Examiner—Jack I. Berman
Attorney, Agent, or Firm—Bruce L. Adams; Van C. Wilks

[57] ABSTRACT

The present invention provides a method of manufacturing a probe having an extremely hard and acute tip, which involves the steps of precipitating a carbon film mixed with a columnar diamond crystal and an amorphous carbonic component at a tip of a probe material; and protruding the columnar diamond crystal by selectively etching the amorphous carbonic component. According to the present invention, it is possible to improve a resolving power of the analyzing device and probe durability as well.

2 Claims, 2 Drawing Sheets

DIAMOND PROBE AND FORMING METHOD THEREOF

BACKGROUND OF THE INVENTION

The present invention relates to a detection probe for use with a detecting unit in the sector of analytic devices and scanning type tunnel microscopes.

One typical arrangement of a scanning type tunnel microscope is that a tunnel current flowing in between a sample surface and a tip of a detection probe is detected, and atomic structures are observed by effecting control between the sample surface and the tip of the detection probe so that the tunnel current becomes constant. In the thus arranged microscope, the resolving power is determined by a condition of the probe tip, and it is therefore required that the probe be shaped more acutely to increase the resolving power.

Known conventional methods are that a tip of a rod formed of platinum or tungsten is sharpened in a conical shape by mechanical grinding, or the tip is shaped by electrolytic grinding (Japanese Patent Laid-Open No. 61-332326 discloses a method of forming a needle-like member by the electrolytic grinding).

There are caused drawbacks incidental to the probes manufactured by the foregoing conventional methods. The mechanical grinding does not provide a smoothly stretched probe tip but creates sagging, as a result of which a sharpened tip is not obtained, or a wire diameter is limited because of creation of grinding undercuts when applying a grindstone in the case of a small wire diameter. Based on the electrolytic grinding, it is in contrast advantageous that a reaction time can be reduced when the wire diameter is small rather than large. If a timing at which to stop the reaction deviates, this results in such a defect that the acute tip can not be attained. Besides, the tip of the probe manufactured by the mechanical grinding or electrolytic grinding tends to be destroyed simply by bringing the probe into slight contact with the sample surface on the occasion of effecting a rough locating process on the sample surface during a scan of a scanning type tunnel microscope. If a well-conditioned rough locating mechanism is not prepared, there arises a problem in which the probe has to be often replaced.

SUMMARY OF THE INVENTION

It is an object of the invention to provide an improved method for forming an extremly acute probe tip for a tunnel microscopy.

Another object of the invention is to provide an improved extremly hard probe tip of a tunnel microscopy.

Other and further objects, features and advantages of the invention will appear more fully from the following description.

For the purpose of solving the foregoing problems, the present invention provides a diamond probe arranged in such a way that diamond grains are laminated on a pointed tip of a metal rod, and a conductive material is thinly coated thereon by vapor deposition or sputtering, wherein the topmost part of the probe tip can be defined as an angular part of the diamond grain. With this arrangement, it is possible to manufacture a conductive probe having the extremely acute and hard tip.

There is another probe having a configuration that spikes of diamond crystal are protruded shown in FIG. 1. Such probe is obtained by the steps of precipitating a carbon film mixed with columnar diamond crystals and amorphous materials by a gas-phase synthesizing method, and thereafter selectively etching only the amorphous carbonic component.

The probe acquired by the above-mentioned method has a tip the topmost part of which is composed of the protruded columnar diamond crystal, and it is therefore feasible to obtain the extremely acute tip and ameliorate a resolving power of an analyzing device.

In addition, the diamond has the highest hardness among all materials. Hence, even when the probe touches the sample surface during a rough locating process, it is possible to prevent such a phenomenon that the probe tip is destroyed or deformed.

DETAILED DESCRIPTION

The present embodiment will deal with a detection probe for use with a detecting unit of a scanning type tunnel microscope. The embodiment will hereinafter be described with reference to the accompanying drawings.

Figure 1A:
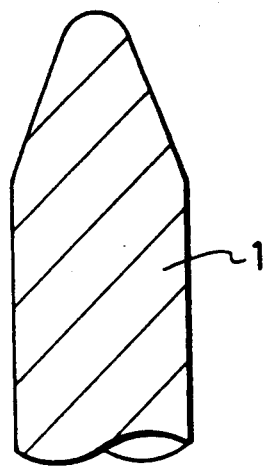
FIGS. 1(A)–(D) are sectional views of assistance in explaining the steps of manufacturing a diamond probe of the invention.
Figure 2:
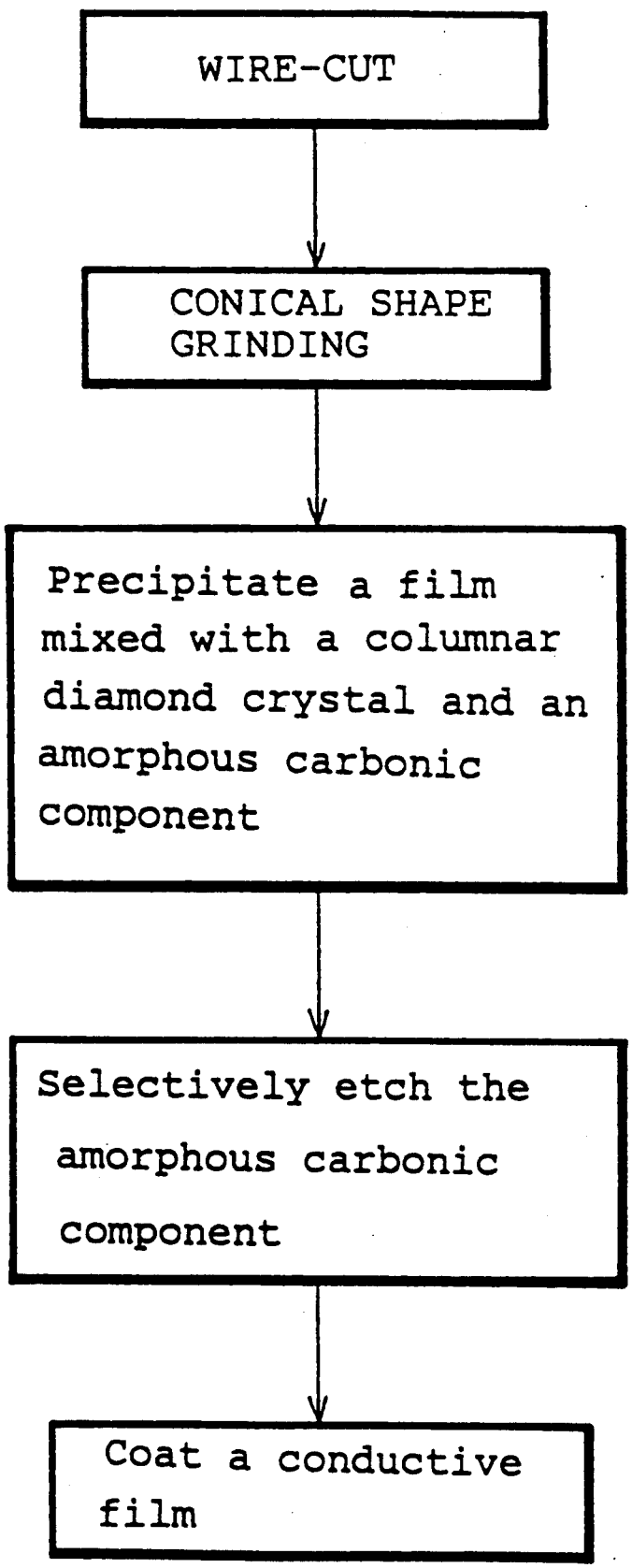
FIG. 2 is an explanatory flow chart showing the steps of manufacturing the diamond probe of the invention.

In accordance with the steps, shown in FIG. 2, of manufacturing a probe, a rod wire is at first cut to an arbitrary length (in this embodiment, a tungsten rod wire of $\phi$ 0.3 mm is cut to a length of 20 mm), and the tip thereof is machined to assume a conical configuration by mechanical grinding, thus obtaining a probe material 1 (FIG. 1(A)).

Figure 1B:
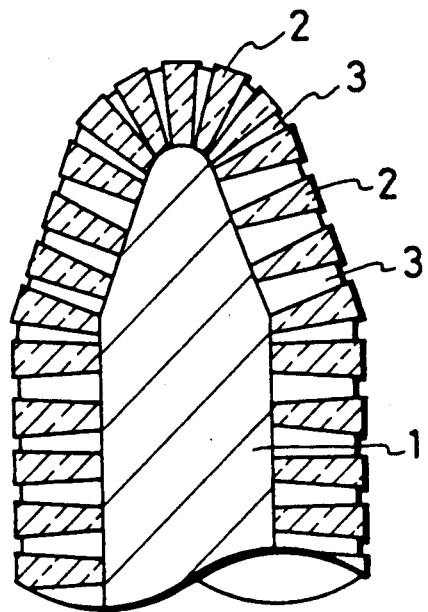

Precipitated, as depicted in FIG. 1(B), on a surface of the probe material 1 is a carbon film (a film thickness is 10 $\mu$m; hereinafter referred to as a "mixing film") mixed with a columnar diamond crystal 2 and an amorphous carbonic component 3 by a gas-phase synthesizing method. In this embodiment, the gas-phase synthesizing method may be a microwave plasma CVD method in which the material is a mixed gas of hydrogen and hydrocarbon. The mixing film is precipitated under synthesizing conditions shown in Table 1.

TABLE 1

| | |
|---|---|
| Material gas component | $H_2$ + $CH_4$ |
| Material gas volumetric flow ratio | $CH_4/H_2$ = 2.0~4.0 vol % |
| Gas pressure | 30~40 Torr |
| Microwave frequency | 2.45 GHz |
| Microwave output | 300~500 W |
| Precipitating time | 10 hour |

Figure 1C:
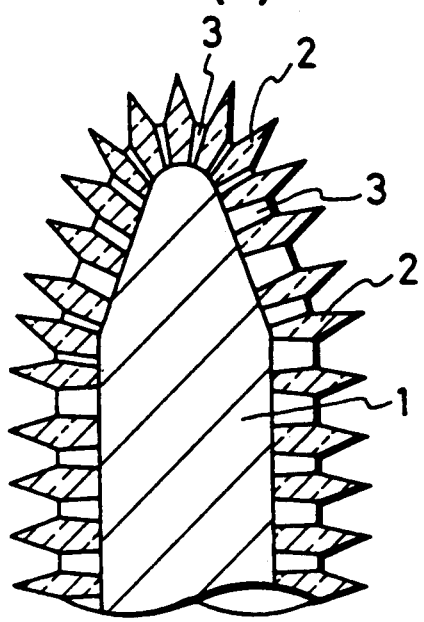

Next, an oxygen gas is introduced into a microwave plasma CVD device instead of the mixed gas of hydrogen and hydrocarbon, and the mixing film undergoes oxygen plasma etching. Table 2 shows one example of etching conditions. A velocity of the oxygen-plasma-based etching of the amorphous carbonic component 3 is overwhelmingly higher than that of the columnar diamond crystal 2. The etching priority is given to the amorphous carbonic component 3, and there is obtained a probe formed, as illustrated in FIG. 1(C), with a highly sharpened tip where the columnar diamond crystal is protruded.

TABLE 2

| Etching gas | O₂ or atmosphere |
|---|---|
| Gas pressure | 5 ~ 10 Torr |
| Microwave frequency | 2.45 GHz |
| Microwave output | 300 W |
| Etching time | 10 min |

Figure 1D:
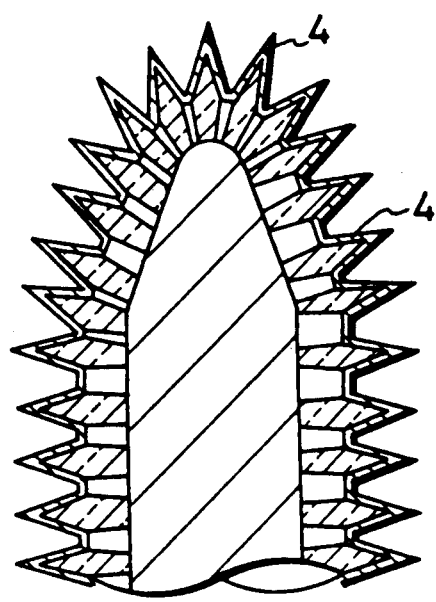

It is observed from FIG. 1(D) that a platinum conductive film 4 having a thickness of approximately several-ten Å is formed on the probe surface by sputtering. A probe for a detecting unit dedicated to the scanning type tunnel microscope is completely manufactured.

In accordance with another steps of manufacturing a probe, a rod wire is at first cut to an arbitrary length (in this embodiment, a stainless rod wire of $\phi$ 1 mm is cut to a length of 20 mm), and the tip thereof is machined in a conical shape by mechanical grinding. Subsequent to this step, the conical part is defaced to increase a density of precipitation of diamond grains, and diamond synthesization is then performed. The diamond synthesization entails a method (a microwave plasma CVD method) of precipitating the diamond by effecting microwave non-polar discharge of a mixed gas of hydrogen and hydrocarbon.

Subsequently, a platinum thin film having a thickness of approximately several-ten Å is formed on the probe covered with the diamond grains by sputtering to exhibit conductivity. The probe including a conductive layer consisting of the layer of diamond grains and the platinum thin film is manufactured. An experiment is carried out by actually incorporating the thus manufactured probe serving as a detection unit probe into the scanning type tunnel microscope. It can be affirmed from the experiment that a high resolving power can be obtained with stability, causing no problem inherent in the prior art products.

As discussed above, according to the present invention, the remarkably acute tip can be obtained, and the resolving power of the device can also be improved.

Besides, since the tip is composed of the diamond having the highest hardness among all materials, it is possible to prevent the phenomenon that the probe tip is destroyed or deformed even when the probe comes in contact with the sample surface in the case of effecting the rough locating process and to enhance the durability of the probe.

What is claimed is:

1. A method of forming a diamond probe, comprising the steps of: precipitating a carbon film comprised of a mixture of a columnar diamond crystal and an amorphous carbonic component at a pointed tip of a probe material by a gas-phase synthesizing method; thereafter causing said columnar diamond crystal to protrude by selectively etching only said amorphous carbonic component; and subsequently coating a conductive film on a probe formed with said protruded columnar diamond crystal.

2. A diamond probe comprising: a probe material having a pointed tip on which to form a carbon film comprised of a mixture of a columnar diamond crystal and an amorphous carbonic component, and a conductive film coated on said carbon film.

* * * * *